Oct. 23, 1956  S. L. ADELSON  2,768,369
MALFUNCTION INDICATING AND RECORDING SYSTEM
Filed March 8, 1954  3 Sheets-Sheet 2

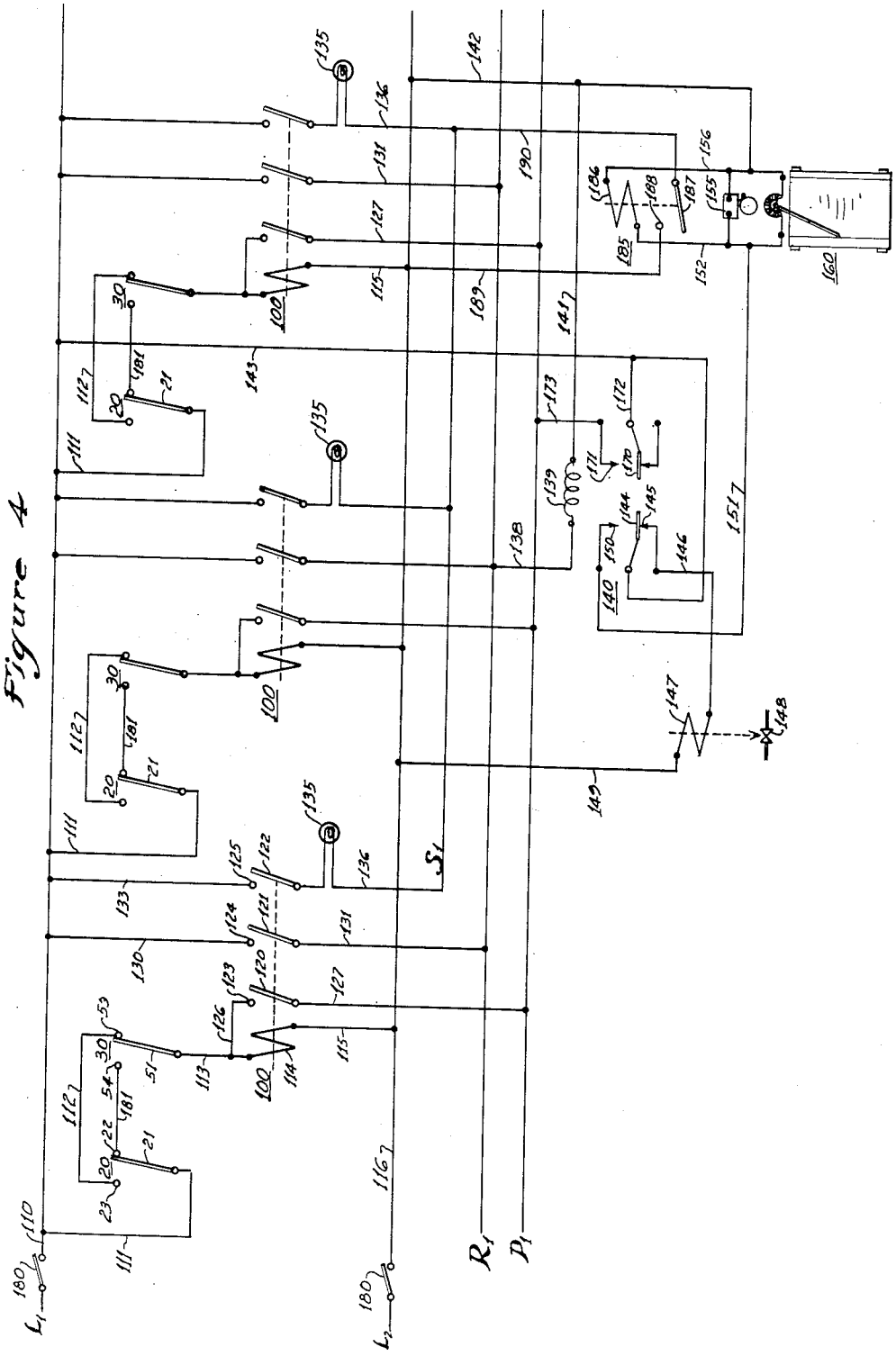

United States Patent Office 2,768,369
Patented Oct. 23, 1956

2,768,369

MALFUNCTION INDICATING AND RECORDING SYSTEM

Samuel L. Adelson, Tucson, Ariz., assignor to Infilco Incorporated, Tucson, Ariz., a corporation of Delaware Application March 8, 1954, Serial No. 414,701

16 Claims. (Cl. 340—213)

This invention relates to a signaling system, and more particularly to a signaling system by which an indication and a record can be obtained of the improper functioning of a component of process equipment, such as, for example, one or more of a plurality of valves or pumps or motors which are controlled to operate in accordance with a predetermined program.

It is an object of the invention to provide improved malfunction indicating and recording means.

A specific object of the invention is to provide means for indicating and recording the failure of one or more components of a process system to function in accordance with a predetermined program.

Another object is to provide means of this general type which will indicate which of a multitude of devices is or are malfunctioning and will record the fact and time of their malfunctioning.

Another object is to provide means of this general type which are simple in construction and use, yet afford indication and recording of the malfunctioning of any desired number of programmed devices.

Another object of the invention is to provide a system for indicating and recording improper operation of a component of process equipment, including means for automatically stopping the process when one or more components of the process equipment fail to function as programmed.

Another object is to provide a recording system wherein a single-pen recorder provides records of the malfunctioning of any desired number of programmed devices.

A further object is to provide a signaling system by which indication of the improper operation of any number of programmed devices may be given, and the time of improper operation of any number of devices is recorded by means of a single-pen recorder.

Other objects will become apparent from a consideration of the detailed description and the claims which follow.

An example of process equipment contemplated herein are the several valves of a water softener of the ion exchange type, of which some are programmed to be open and some are programmed to be closed, respectively, during each of the several stages of operation, including the softening process, and the backwashing, the regeneration, and the rinsing of the softening media. Obviously, if a valve programmed to open during one of the stages of operation of such a softener closes, or vice versa, one programmed to close opens, faulty connections may be established. Thus, for example, if during the softening process the wash water valve, programmed to close, opens, then, with the usual connections from the wash valve to the raw water inlet line and the effluent line, the raw water could by-pass the softener through the open wash water valve to the soft water effluent valve, and raw water would be sent to service. If such an undesirable condition arises, an indicating signal, visual, or audible, or both, should be given. Means should also be provided to automatically stop operation until the malfunctioning is corrected. It is also very desirable that a record be made of the malfunctioning.

According to conventional practice, a plurality of pens, one for each valve, would be used to record the malfunctioning of the programmed devices. When there are a great number of programmed devices, such as in a large water softening plant, which may include 50 or more programmed valves, a correspondingly large number of pens would have to be used. Such a number of pens obviously will require several separate recorders, the highest number of pens available at present in any one recorder being 16. Aside from the great cost involved in providing and maintaining a plurality of multiple-pen recorders it will also be extremely cumbersome to analyze the charts. Taking, for example, a softening plant with 50 programmed valves, at least 4 recorders will be required. This means that 4 charts will have to be unrolled, the time markings on all aligned, and then the lines drawn by 50 pens be examined for any malfunctioning records.

I suggest to substitute for this complicated recording procedure a single-pen recorder to which a force is applied only when malfunctioning occurs, and which, thereby, will make a record of the exact time of the malfunctioning, though it will not record which of the devices has been out of order. This, however, is unnecessary, as in my system an individual signal is provided for each programmed device, which is actuated by malfunctioning of the respective device and continues to signal until the proper operation of the respective device has been restored. Such a signal will readily guide the operator to the then malfunctioning device, and after the operator has made the usual entry in his log book, he will proceed to restore the device to its proper operation. When the superintendent of the plant wants to make a check of the plant operation, all he has to do is to look at one chart, where proper functioning of all programmed devices is recorded by a single line drawn by a single pen, and malfunctioning of any of the devices is shown by a change in the direction of the line. Knowing the fact and time of malfunctioning from his chart, he can readily find from the operators' log book which of the devices did not follow the program. Should there be no corresponding entry in the log book, then the superintendent knows that the operator has not done his duty at the time the malfunctioning occurred. Thus, not only is the supervision of the operation of a multitude of programmed devices very simple, but at the same time a check on the reliability of the operator is obtained.

Any suitable recorder can be used, such as, for example, one of the well-known pressure operated recorders. The pressure fluid inlet valve of such a recorder can be positioned by a solenoid forming a part of the malfunction indicating and recording system. The simplest form of a recorder for my system is a recording voltmeter having one pen. During normal operation of the programmed device no voltage is applied to the voltmeter, so that the pen draws a line at the zero position. When malfunctioning occurs, a voltage is automatically applied to the voltmeter, and the pen is moved to a position in accordance with the voltage and draws a line in that position until the proper operation is restored, whereupon the voltmeter is automatically cut out and the arm returns to its zero position. Instead of a voltmeter a recording wattmeter could be used for providing a record of the time of malfunctioning.

The invention will be more readily understood by reference to the drawings, wherein:

Figure 1 shows diagrammatically for the several operational stages of a water softener the positions of the disk of a conventional disk valve controlling the operation of the flow valves of the softener, and also shows for one position of the valve disk the normal corresponding positions of the flow valves and their associated switches, as well as of the program switches controlling the malfunction indicating and recording system;

Figure 4 is another electrical wiring diagram of the malfunction indicating and recording system.

The invention will be described as applied to the conventional equipment used for softening water by means of ion exchange, but it will be understood that the invention is not limited to this particular application.

Figure 1:
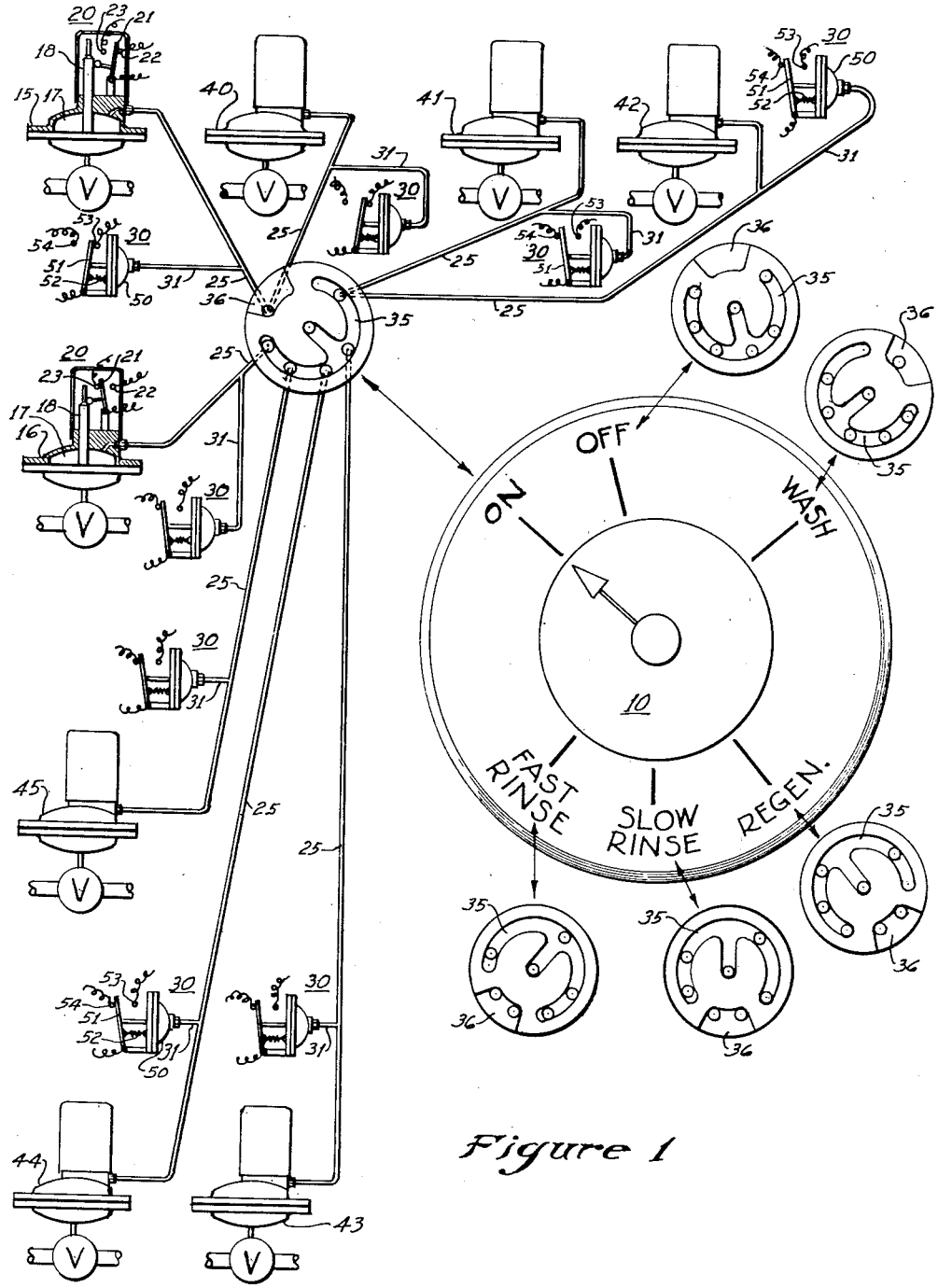

Figure 1 shows the several positions of a disk valve 10 controlling the operation of a softener, not shown, for the successive operating stages, and shows also for one operating stage the programmed positions of the flow valves of the softener and the electrical switches which control the electrical connections to the malfunctioning system. The disk valve 10 constitutes a programming means for the softening system. Such disk valves and their operation are well known in the art and need therefore not be described in detail. For purposes of illustration all flow valves are assumed to be of the type diagrammatically illustrated by the raw water inlet valve 15 and the fast rinse exhaust valve 16, i. e., diaphragm valves held in closed position by pressure fluid admitted to their diaphragm operating chambers 17 and opening when the operating chambers are vented. Obviously, different valves could be used. Each of the flow valves has a plunger 18, such as shown for the valves 15 and 16, which is movable with the valve diaphragm. A single pole double-throw switch 20 is positioned by the plunger 18 so that pole 21 contacts one of its contacts 22 and 23. In each pressure fluid line 25 from the disk valve 10 to a flow valve, a fluid pressure actuated program switch 30 is connected by a line 31, preferably near the disk valve 10. While the flow valves and the switches 20 and 30 are shown only for the "on" or softening position, it will be understood that any explanations regarding this position will hold for the other positions of the disk valve 10.

As clearly shown in Figure 1, in each position of the disk valve 10 certain ports are connected to the pressure channel 35 of the disk valve and others to its waste channel 36. Thus, when the disk valve 10 is set for the "on" or softening position, the ports connected to the raw water inlet valve 15 and the soft water outlet valve 40 are connected to the waste channel 36 of the disk valve. Therefore, no pressure fluid is admitted to the diaphragm operating chambers of valves 15 and 40, and these valves are open. The ports connecting to the wash valve 41, waste valve 42, regenerant inlet valve 43, slow rinse and regenerant exhaust valve 44, rinse influent valve 45, and fast rinse exhaust valve 16, are connected in this position of the disk valve 10 to the pressure channel 35, so that pressure fluid is admitted to the diaphragm operating chambers of these valves, and they are held in closed position.

When a flow valve is open, its plunger 18 is in the position shown in Figure 1 for the raw water inlet valve 15 and positions its associated switch 20 so that pole 21 contacts contact 22. When a valve is closed, its plunger 18 is in the position shown in Figure 1 for the fast rinse exhaust valve 16 and positions the pole 20 to contact the contact 23.

When no pressure fluid is admitted to the line 25 leading from a disk valve port to a flow valve, then the diaphragm chamber 50 of the fluid pressure actuated switch 30 connected to the respective line 25 likewise does not receive fluid pressure, and its pole 51 is held by spring 52 in the position shown in Figure 1 for the switches 30 connected in the lines to the raw water inlet valve 15, and the soft water outlet valve 40. In this position pole 51 contacts contact 53. When pressure fluid is admitted to the line from a disk valve port to a flow valve, the diaphragm chamber of the switch 30 connected in that line also receives fluid pressure and the respective pole 51 is moved to the position shown, for example, for the switch 30 connected in the line to the wash valve 41, where it contacts contact 54.

Figure 2:
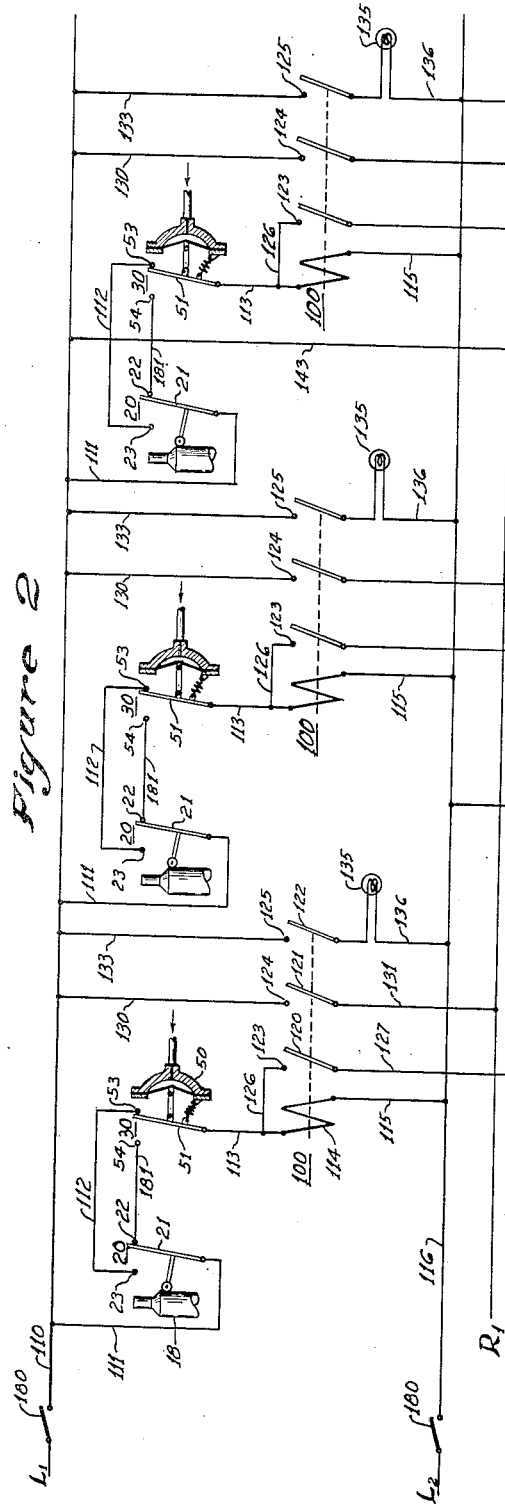
Figure 2 is an electrical wiring diagram of the malfunction indicating and recording system.

In the wiring diagram of Figure 2, the valve actuated switch 20 and the pressure actuated program switch 30 are shown for purposes of illustration for three valves, but any desired number of valves could be incorporated in the same manner, and explanation with regard to one valve will hold for all valves.

Assuming that according to the programmer 10 the valve with which the first pair of switches 20 and 30 is associated is programmed to open and the valve does open, then the switches will be in the position shown in Figure 2 where pole 21 of switch 20 contacts contact 22 and pole 51 of switch 30 contacts contact 53. In this position of the switches the relay 100 will not be energized, as the circuit from $L_1$ to $L_2$ through the coil 114 of the relay 100 is broken between pole 51 and contact 54 of switch 30. Assuming, however, that the valve programmed to open does not open, then the valve actuated switch 20 will be in a position where its pole 21 contacts its contact 23. The pressure operated switch 30, however, will be in its programmed position where its pole 51 contacts contact 53. In this position of the switches 20 and 30 a circuit is closed from $L_1$ through conductors 110 and 111, pole 21 and contact 23 of switch 20, conductor 112, contact 53 and pole 51 of switch 30, conductor 113, coil 114 of relay 100, and conductors 115 and 116 to $L_2$. When the coil of relay 100 is thus energized, the relay closes and its three poles 120, 121 and 122 contact contacts 123, 124 and 125, respectively. This establishes a circuit from $L_1$ through conductors 110 and 111, pole 21, contact 23, conductor 112, contact 53, pole 51, conductors 113 and 126, contact 123 and pole 120 of relay 100, and conductor 127 to line $P_1$. Further, line $L_1$ is connected through conductors 110 and 130, contact 124 and pole 121 of relay 100 and conductor 131 to line $R_1$, and through conductors 110 and 133, contact 125 and pole 122 of relay 100 to one side of lamp 135, the other side of which is connected to $L_2$ through conductors 136 and 116. The lamp 135 will therefore light and thus give an indication of the malfunctioning of the respective valve. At the same time current will also flow from $R_1$ (which is now at the same potential at $L_1$) through conductor 138, coil 139 of relay 140, which is of the "delay to close" type, and conductors 141, 142 and 116 to $L_2$. Before the expiration of the time-delay, which is previously set to a desired period of delay, current flows from $L_1$ through conductors 110 and 143, pole 144 and contact 145 of time-delay relay 140, conductor 146, solenoid 147 of the main valve 148 in the raw water line to the plant, and conductors 149 and 116 to $L_2$. While this circuit is closed, the valve 148 remains open to passage of water to the softening plant, the construction of the solenoid operated valve 148 being such that it is open when the solenoid 147 is energized and closes when it is deenergized.

At the expiration of the set time-delay period the pole 144 of the relay 140 will contact contact 150 and pole 170 contacts contact 171. For the sake of simplicity, this moving of the poles 144 and 170 to contacts 150 and 171 will be referred to herein as "closing" of the time-delay relay. When pole 144 leaves contact 145, the circuit through the solenoid 147 is broken, and the valve 148 closes and remains closed until the circuit through its solenoid is again closed when the coil 139 of time-delay relay 140 is deenergized.

Figure 3:
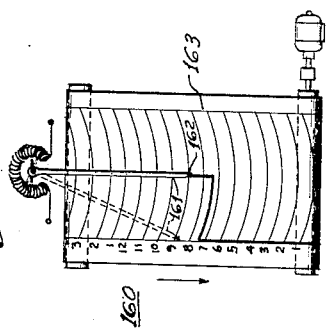
Figure 3 is an enlarged diagrammatical view of the recording voltmeter of Figure 2.

When pole 144 contacts contact 150, current will flow from $L_1$ through conductors 110 and 143, pole 144, contact 150, conductors 151 and 152, alarm 155, and conductors 156, 142 and 116 to $L_2$. Thus, the alarm 155 will sound only after the preset delay period has expired. At the same time the potential across L₁ and L₂ will be applied to the recording voltmeter 160 whose arm 161, carrying a pen 162, will thereby be deflected from its normal zero position. When using a recorder as shown in Figure 3, the zero position of the arm 161 may be as shown in dotted lines in the figure, so that the pen 162 will draw a line at the left margin of the downwardly moving chart 163. For clearness of the record it is desirable that the pen 162 be moved to the center of the chart when at malfunctioning a voltage is applied to the coil of the voltmeter. If the voltage of the control system is, say 115 volts and a 230 volt coil is used in the recorder, then at malfunctioning the pen will draw a line to the center of the chart, as shown in Figure 3. The pen will remain in the center of the chart until the coil 139 of time-delay relay 140 is deenergized, i. e., until correction of the malfunctioning.

When, at the end of the time-delay period, the pole 170 of relay 140 contacts contact 171, a circuit is established as follows: from L₁ through conductors 110, 143 and 172, pole 170, contact 171, conductor 173, line P₁, conductor 127, pole 120, contact 123, conductor 126, coil 114, and conductors 115 and 116 to L₂. This circuit keeps coil 114 energized and therefore lamp 135 lighted regardless of any subsequent change in the positions of the valve switch 20 or the program switch 30, until the power across circuit L₁—L₂ has been cut off at the main switch 180. Thus, should a valve fail to operate as programmed within the time for which the time-delay relay 140 is set, but operate as programmed thereafter, then the respective lamp 135 will remain lighted and indicate the delay in proper operation of the valve.

Consideration of Figure 2 will show that in the case of a valve programmed to close but remaining open, the electrical connections are made and broken in the same manner as described above with respect to a valve programmed to open but remaining closed. When the valve is programmed to close and it closes, then the switches 20 and 30 associated therewith are in the position where pole 21 of valve switch 20 contacts contact 23 and pole 51 of program switch 30 contacts contact 54. In this position of the switches 20 and 30 the relay 100 remains deenergized as the circuit from L₁ to L₂ through the coil 114 is broken between pole 21 and contact 22 of switch 20. Should the valve, however, fail to close, then the pole 21 of valve switch 20 will continue to contact contact 22 while the pole 51 of the program switch 30 will contact contact 54. In this position of the switches 20 and 30 a circuit is established from L₁ through conductors 110 and 111, pole 21 and contact 22 of the valve switch 20, conductor 181, contact 54 and pole 51 of the program switch 30, conductor 113, coil 114 of relay 100 and conductors 115 and 116 to L₂. This energizes the relay 100, and the signaling and recording devices are operated and the main inlet valve closed as described above.

Since both faulty opening and closing of a flow valve results in the same operation, it becomes obvious that any desired number of programmed valves can be incorporated in the wiring diagram of the malfunction indicating and recording system irrespective of the fact that some groups of the programmed valves will be programmed for closing and others for opening. When several of the programmed valves are malfunctioning at the same time, only one alarm will be sounded and only one record will be made of the time when the malfunctioning occurs, but the lamps which are individual to each valve will give an exact indication of the identity and number of the malfunctioning devices. It will be obvious that the programmed devices need not be valves. Instead, the malfunctioning, for example, of pumps, or motors, or of valves and pumps operating in a common program with or without motors, can be indicated and recorded by my system. Each programmed device requires a switch positioned by it, a program switch, a relay such as 100, a lamp and a power circuit through the switches and relay, as shown in Figure 2, for each of the three valves. The other parts of the wiring diagram are common to all programmed devices.

Normally there is a slight delay in the positioning of the valve switch 20 after it is programmed. If this delay is less than that for which the time-delay relay 140 is set, the lamp 135 will light during the delay of the valve switch 20 and go out when the switch moves to its proper position, and the coil 139 of the time-delay relay 140 will be deenergized before the poles 144 and 170 move to contacts 150 and 171, respectively, and the alarm and recorder are actuated. It is the purpose of the time-delay relay to permit such a slight delay in the positioning of the valve switch, so that the alarm will not be sounded and no record be made during this normal delay. If it is desired that none of the lamps 135 shall be lighted during the normal slight delay in the positioning of the valve switch 20 after it is programmed, but to be lighted only when a valve or valves do not follow the program, this can be attained by using the wiring diagram shown in Figure 4. This wiring diagram is substantially the same as that of Figure 2, except that a conductor S₁ and a single-pole relay 185 have been added, and the terminal of the lamp 135, which in Figure 2 was connected to line L₂, is now connected to line S₁. The coil 186 of the relay 185 is connected in parallel with the alarm 155 so that when the latter is in operation the coil 186 will be energized, and pole 187 of relay 185 will contact contact 188, thus bringing the line S₁ to the same potential as the line L₂ by way of conductors 189 and 190. With these connections, the lamp 135 will not be lighted until the expiration of the time-delay period, as set on time-delay relay 140 because line S₁ will not be of the potential of line L₂ unless the alarm 155 is actuated.

It will be seen that the invention provides simple signaling means for indicating which of a number of programmed devices malfunctions, for sounding an alarm and for making a record of the time at which malfunctioning occurs, and for stopping the operation of all programmed devices until the malfunctioning is corrected. The alarm, recorder, and means for stopping of the operation are actuated only after the normal delay period in the positioning of programmed devices has expired. The signaling means indicating which programmed device malfunctions can be connected so as to give a signal also during this delay period or only thereafter, and this signal remains actuated should a malfunctioning device follow the program after expiration of the normal delay period. For example, should a valve stick, but close after the normal time for its closing, there will be a clear indication that the valve is not in order, even though it eventually closes. It will be obvious that the individual signaling devices need not give visual signals, but can give audible signals, if desired.

I claim:

1. A system for indicating malfunctioning of one or more of a number of programmed devices, comprising a programmer, a plurality of programmed devices, a first and a second switch for each programmed device, each programmed device and its second switch being connected to said programmer and adapted to receive simultaneously actuating impulses therefrom, said first switch being positioned by the programmed device in response to actuating impulses applied thereto by said programmer, a relay for each programmed device, a power circuit through the switches of each programmed device and its relay, and a signaling device connected to said relay, the coil of a relay being energized and its connected signaling device being actuated when the respective programmed device does not position its first switch in accordance with an actuating impulse applied to said device, a time-delay relay common to all programmed devices, the coil of said time-delay relay being energized when one of said first mentioned relays closes due to its coil being energized, and an alarm connected with said time-delay relay in such manner as to be actuated by closing of said time-delay relay at the end of its time-delay relay period.

2. The apparatus of claim 1, including also a holding circuit through the coil of each of said first mentioned relays and said time-delay relay, said holding circuit being closed by closing of said time-delay relay at the expiration of the time-delay period, whereby said signaling device remains actuated when a previously malfunctioning device resumes its programmed operation after expiration of the time-delay period.

3. A system for indicating and recording failure of one or more of a number of devices to operate in accordance with a predetermined program, said system comprising for each programmed device a first switch positioned in accordance with the operation of the programmed device, a second switch, a relay, a power circuit through said switches and the coil of said relay, and a signaling device, means for simultaneously applying an actuating impulse to each programmed device and to its second switch, said power circuit being closed and said coil energized only when the associated programmed device fails to position its first switch in response to the actuating impulse received by the device, and said signaling device being actuated only when said relay is closed, a time-delay relay common to all programmed devices and having a coil energized by closing of one of said first mentioned relays, a recorder and means operative upon closing of said time-delay relay at the end of the set time-delay period to actuate said recorder.

4. The apparatus of claim 3, including also means for delaying actuating of said signaling device until said time-delay relay closes at the end of the set time-relay period.

5. A system for indicating malfunctioning of one or more of a number of programmed devices comprising a relay for each programmed device, means for energizing the coil of the relay when its associated programmed device malfunctions, a signaling device for each programmed device and actuated when the coil of the respective relay is energized, a time-delay relay common to all programmed devices, the coil of said time-delay relay being energized when the coil of one of said first mentioned relays is energized, an alarm, an actuating circuit through said alarm, and a holding circuit for each actuated signaling device, said actuating circuit and said holding circuit being closed by closing of said time-delay relay at the expiration of the time-delay period.

6. A system according to claim 5, including also a single-pen recorder, a circuit through said recorder, said recorder including a chart, means for continuously moving said chart in one direction, and an arm pivotally supported over, and normally in zero position with respect to, said chart but swingable from said zero position when the circuit through said recorder is closed, said circuit being closed when the time-delay relay closes at the expiration of the time-delay period.

7. A system for indicating and recording malfunctioning of one or more of a number of programmed devices, comprising for each programmed device a relay, a power circuit through said relay, switch means operative to close said power circuit upon malfunctioning of the respective programmed device, and a signaling device connected to said relay and actuated by closing of said power circuit, a time-delay relay common to all programmed devices, the coil of said time-delay relay being energized when the coil of one of said first mentioned relays is energized, means for delaying actuation of said signaling device until said time-delay relay closes, a recorder, and means for actuating said recorder when said time-delay relay closes.

8. In the operation of a liquid treating plant by programming means, said plant having a solenoid operated main inlet valve, a system for indicating malfunctioning of one or more of a number of programmed devices, said system comprising for each programmed device a first and a second single pole double-throw switch, the first switch being positioned by the programmed device in accordance with its operation, means for simultaneously applying to each programmed device and to its second switch an actuating impulse from said programming means, a relay, a power circuit through each pair of first and second switches and the coil of the associated relay, said power circuit being closed when the respective programmed device does not position its first switch in accordance with the impulse received by it, a second power circuit through one of the poles of said relay, and a lamp in said second power circuit, a time-delay relay common to all programmed devices, the coil of said relay being energized when one of said switch-actuated relays closes, an alarm, a third power circuit through said alarm, and a fourth power circuit through the solenoid of said main inlet valve, said third power circuit being closed and said fourth power circuit broken by closing of the time-delay relay at the expiration of the set time-delay period for closing the main inlet valve to the plant and for simultaneously sounding said alarm.

9. The apparatus of claim 8, including also a single-pen recording voltmeter and means for applying a voltage to said voltmeter when the time-delay relay closes.

10. The apparatus of claim 8, including also means for establishing a circuit through the coil of a closed switch-actuated relay and one pole of the time-delay relay when said time-delay relay closes, whereby said switch-actuated relay remains closed and its associated lamp lighted irrespective of a subsequent change in position of said first switch.

11. In the operation of a liquid treating plant by programming means, a system for indicating and recording malfunctioning of one or more of a number of programmed devices, said system comprising for each programmed device first and second switches, a relay, a power circuit through each pair of first and second switches and the coil of the associated relay, and a signaling device, said first switches being positioned by said programmed devices in accordance with their operation, means for simultaneously applying an actuating impulse to each programmed device and its second switch, said power circuits being closed only when said programmed devices fail to position their associated first switches in accordance with the actuating impulses applied to them, said signaling device being lighted only when said relays are closed due to energizing of their coils, a time-delay relay common to all programmed devices, means for energizing the coil of said time-delay relay when one of said switch-operated relays closes, an alarm, a single-pen recorder, and electrical means for actuating said alarm at the end of the time-delay period set for said time-delay relay and for simultaneously applying a force to said recorder.

12. The system of claim 11, including also a solenoid-operated valve controlling flow of liquid to said liquid treating plant, said valve being open when said solenoid is energized and closed when the solenoid is deenergized, and means for automatically energizing said solenoid until the expiration of the time-delay period and for deenergizing said solenoid when the time-delay relay closes at the expiration of its time-delay period to stop flow of liquid to said plant upon maufunctioning of a programmed device.

13. The apparatus of claim 11, wherein said recorder comprises a single-pen recording voltmeter, said meter including a chart, means for continuously moving said chart in one direction, an arm pivotally supported over, and normally in zero position with respect to, said chart but swingable from said zero position when a voltage is applied to the voltmeter, and a pen carried by said arm and in contact with said chart.

14. In the operation of a water softening plant having a plurality of valves, a programming device controlling flow of pressure fluid to said valves to open and close said valves in accordance with a predetermined program, and a main inlet valve, a system for indicating and recording failure of one or more of said programmed valves to open and close as provided in the program and for automatically shutting off the main inlet valve to the softening plant, said system comprising a single pole double-throw switch for each valve, said switches being positioned by opening and closing of said valves, a single pole double-throw switch including a diaphragm chamber connected in the fluid pressure line from the programming device to each valve and thereby connected to fluid pressure or atmosphere in accordance with the program, the poles of said last mentioned switches being held in one position by mechanical means and in the other position by fluid pressure in said diaphragm chambers, a three-pole relay for each programmed valve, means for energizing the coil of said relay when one of the valve-positioned switches is not in its programmed position, a signaling lamp associated with each three-pole relay, a time-delay relay common to all programmed valves, means for energizing the coil of said time-delay relay when one of said three-pole relays closes, an alarm, a recorder, means operative upon closing of said time-delay relay at the end of said time-delay period to actuate said alarm and said recorder, means operative not later than at the end of said time-delay period to light said signaling lamp, a solenoid operative to open the main inlet valve to said softening plant when it is energized and to close it when it is deenergized, and means operative upon closing of said time-delay relay to deenergize said solenoid.

15. The apparatus of claim 8, wherein said second power circuit is closed and said lamp lighted upon closing of said pole of said switch-operated relay due to malfunctioning of said device.

16. The apparatus of claim 8, including also a single-pole relay common to all programmed devices and having its coil connected in parallel with said alarm, said second power circuit including the pole of said single-pole relay whereby said lamp is lighted at the end of the time-delay period of said time-delay relay.

References Cited in the file of this patent
UNITED STATES PATENTS

| | | |
|---|---|---|
| 1,434,072 | Taussig | Oct. 31, 1922 |
| 1,456,148 | Renshaw | May 22, 1923 |
| 2,032,746 | Grant | Mar. 3, 1936 |
| 2,389,204 | Ludi et al. | Nov. 20, 1945 |
| 2,506,394 | Strange | May 2, 1950 |
| 2,682,653 | Clardy | June 29, 1954 |